United States Patent
Tobita et al.

(10) Patent No.: US 7,929,392 B2
(45) Date of Patent: Apr. 19, 2011

(54) OPTICAL DISK APPARATUS AND OPTICAL DISK PROCESSING METHOD

(75) Inventors: Yoshikata Tobita, Fuchu (JP); Kosuke Haruki, Ome (JP); Yoshikazu Shiomi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 498 days.

(21) Appl. No.: 12/130,810

(22) Filed: May 30, 2008

(65) Prior Publication Data
US 2008/0298190 A1      Dec. 4, 2008

(30) Foreign Application Priority Data
May 31, 2007  (JP) ................................. 2007-145351

(51) Int. Cl.
*G11B 7/00* (2006.01)
(52) U.S. Cl. .................. 369/53.21; 369/53.35
(58) Field of Classification Search ......................... None
See application file for complete search history.

(56) References Cited

FOREIGN PATENT DOCUMENTS

| | | |
|---|---|---|
| EP | 1785995 A1 * | 5/2007 |
| JP | 05-307510 | 11/1993 |
| JP | 07-152497 | 6/1995 |
| JP | 10-334620 | 12/1998 |
| JP | 2000-3310 | 1/2000 |
| JP | 2006-251960 | 9/2006 |

* cited by examiner

*Primary Examiner* — Wayne R Young
*Assistant Examiner* — Brian Butcher
(74) *Attorney, Agent, or Firm* — Knobbe, Martens, Olson & Bear LLP (57) ABSTRACT

According to one embodiment, an optical disk apparatus is provided with a read section which reads data from an optical disk to output read information, a determination section which determines presence/absence of an error of the read information to output an error presence/absence signal, a transfer processing section which receives the error presence/absence signal and receives a hash request signal and transfers the hash request signal when the error presence/absence signal indicates the absence of an error, and does not transfer the hash request signal when the error presence/absence signal indicates the presence of an error, and a processing section which performs hash processing to the read information upon reception of the hash request signal.

10 Claims, 8 Drawing Sheets

OPTICAL DISK APPARATUS AND OPTICAL DISK PROCESSING METHOD

CROSS-REFERENCE TO RELATED APPLICATIONS

This application is based upon and claims the benefit of priority from Japanese Patent Application No. 2007-145351, filed May 31, 2007, the entire contents of which are incorporated herein by reference.

BACKGROUND

1. Field

One embodiment of the invention relates to an optical disk apparatus which performs hash processing in response to presence/absence of an error of an optical disk and an optical disk processing method.

2. Description of the Related Art

As is well known, in recent years, many techniques for improving reproduction quality of an optical disk have become known according to advances in optical disks. As one of the techniques, there is an ECC circuit which detects an error of an optical disk to correct the same automatically.

Jpn. Pat. Appln. KOKAI Publication No. 10-334620 discloses a technique for enhancing detection ability to error correction caused by an ECC circuit without reducing capacity of user data of a recording apparatus to realize recording and reproducing processing of user data with high reliability.

In the technique described in JP-A-10-334620, however, error information detected by the ECC circuit is used for performing error correction. Accordingly, for example, how to leverage hash processing which is processing for corruption prevention in the Advanced Access Content System (AACS) processing is not known. The term "hash processing" described in this text means processing for confirming whether or not a certain stream unit (EVOBU) has been corrupted by calculating a hash value of the EVOBU to comparing the calculated result and an expected value with each other.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an optical disk apparatus is provided with a read section which reads data from an optical disk to output read information; a determination section which determines presence/absence of an error of the read information to output an error presence/absence signal; a transfer processing section which receives the error presence/absence signal and receives a hash request signal and transfers the hash request signal when the error presence/absence signal indicates the absence of an error, and does not transfer the hash request signal when the error presence/absence signal indicates the presence of an error; and a processing section which performs hash processing to the read information upon reception of the hash request signal.

Hereinafter, one embodiment of the present invention will be explained in detail with reference to the drawings.

<Optical Disk Apparatus of a First Embodiment of the Present Invention>

Figure 1:
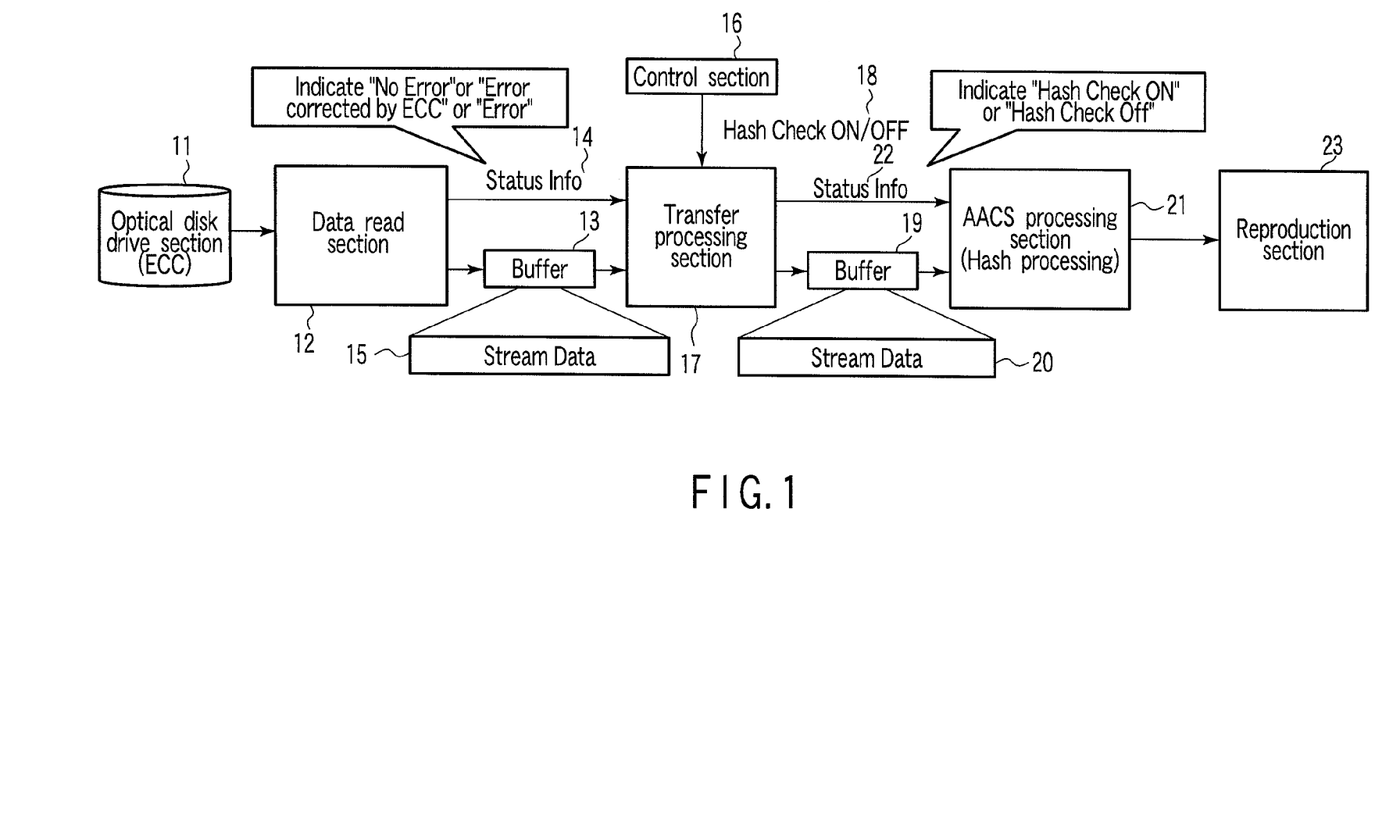
FIG. 1 is a block configuration diagram for explaining a first embodiment of an optical disk apparatus according to the present invention.

First of all, an optical disk apparatus of a first embodiment according to the present invention will be explained in detail with reference to the drawings. FIG. 1 is a block diagram showing one example of a configuration of the optical disk apparatus of the first embodiment of the present invention.

(Configuration)

First, as shown in FIG. 1, an optical disk apparatus 1 according to the first embodiment of the present invention includes an optical disk drive section 11. As one example, the optical disk drive section 11 includes a servo section which holds an optical disk (not shown) to rotate the same at a predetermined rotational speed, an optical pickup (not shown) which emits laser beam and receives reflected beam of the laser beam to output a detection signal in response to the reflected beam, and an error correction circuit (ECC) (not shown) which performs error detection of the detection signal from the optical pickup to output an error presence/absence signal indicating presence or absence of an error and corrects the error in an achievable range when the error is detected. An error presence/absence signal corresponding to stream data which is a read signal is output from the error correction circuit (not shown) to be supplied to a downstream stage.

Further, the optical disk apparatus 1 is provided with a data read section 12 which controls read processing of video stream from the optical disk drive section 11, a buffer 13, a control section 16 which controls a whole operation, a transfer processing section 17 which performs direct memory access (DMA) data transfer processing from the data read section 12 to the downstream stage, a buffer 19, an Advanced Access Content System (AACS) processing section 21 for performing decoding processing of AACS-protected content, for example, for an EVOBU unit, and a reproduction section 23 which reproduces a video signal and an audio signal from the AACS processing section 21.

Here, the data read section 12 reads data from the optical disk drive section 11 to write the same in the buffer 13. The data read section 12 notifies the transfer processing section 17 of an error presence/absence signal (Status Info) 14 indicating either of that an error has been generated in the optical disk drive section 11 at a data read time, that the generated error has been corrected by the ECC, and that an error which could not have been corrected by the ECC has been generated utilizing such means as transfer completion notification, a register, or a message box.

The AACS processing section 21 performs AACS processing which accompanies hash processing or does not include any hash processing according to a hash request signal (or hash necessity/non-necessity signal) of the hash processing (corruption verification) notified from the transfer processing section 17.

The transfer processing section 17 performs control of hash processing in the AACS processing section 21 based upon the error information 14 and the hash request information 22 by a method described in detail later.

(Operation)

Figure 2:
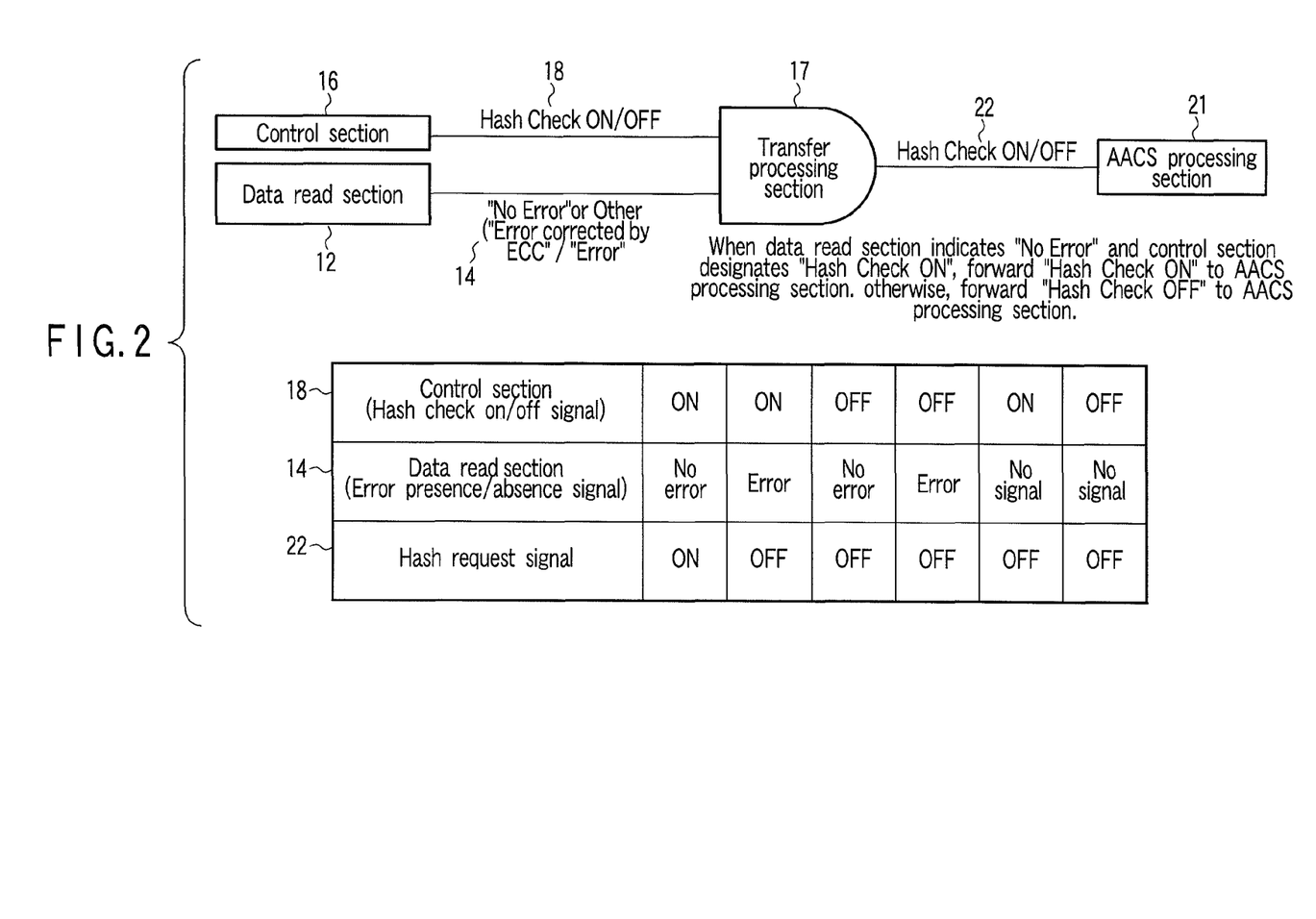
FIG. 2 is a diagram for explaining one example of hash on/off determination logic in a transfer processing section in the optical disk apparatus according to the first embodiment of the present invention.

Next, a control method of hash processing in the AACS processing section 21 based upon the error information 14 and the hash request information 22 by the transfer processing section 17 will be described in detail using the drawings. FIG. 2 is an explanatory diagram showing one example of hash on/off determination logic in the transfer processing section. Likewise, FIG. 3 is a flowchart showing one example of an operation of AACS processing in the optical disk apparatus 1 according to the first embodiment of the present invention.

Figure 3:
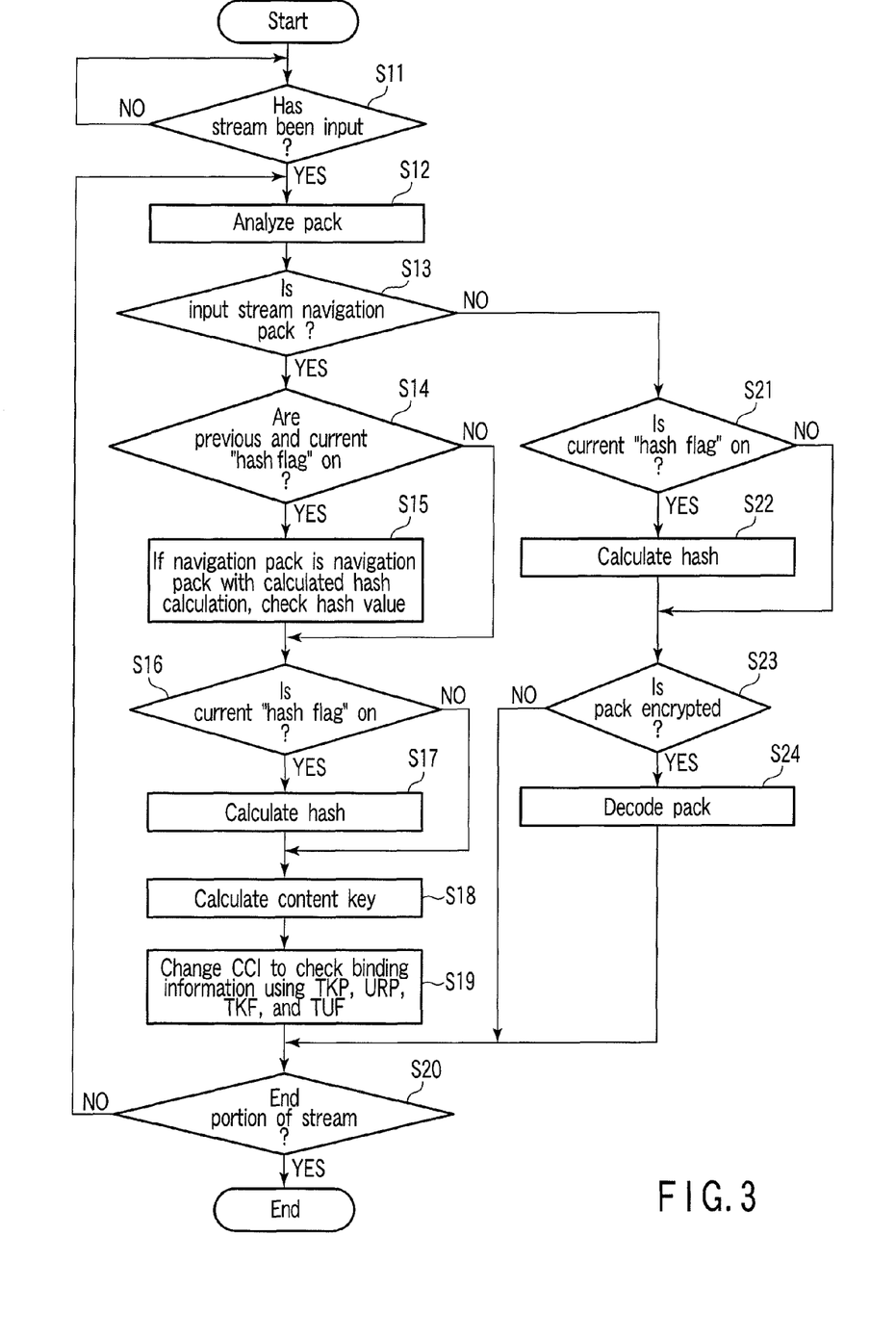
FIG. 3 is a flowchart for explaining one example of an AACS processing operation of the optical disk apparatus according to the first embodiment of the present invention.

Incidentally, each step in the flowchart shown in FIG. 3 can be replaced by a circuit block, so that all steps in each flowchart can be redefined by a block.

The transfer processing section 17 controls the data read section 12 based upon control of the control section 16 to DMA-transfer data from the optical disk drive section 11 to the AACS processing section 21.

As shown in FIG. 2, the control section 16 notifies a hash processing (corruption verification) necessity/non-necessity signal 18 to the transfer processing section 17 according to a reproduction velocity or a reproduction status. As one example, the control section 16 determines that hash processing (corruption verification) should be performed to feed a hash processing necessity/non-necessity signal 18 to the transfer processing section 17 as "Hash Check On" at a reproduction time of an optical disk, and it determines that hash processing (corruption verification) is unnecessary to feed a hash processing necessity/non-necessity signal 18 to the transfer processing section 17 as "Hash Check Off" at a fast forwarding time, at a reverse time, at a stop time, and the like.

The data read section 12 supplies an error presence/absence signal 14 to the transfer processing section 17 according to behavior of the ECC within the optical disk drive section 11. That is, the data read section 12 notifies the transfer processing section 17 of an error presence/absence signal (Status Info) 14 indicating presence or absence of an error in the optical disk drive section 11 via such means as a transfer termination notification, a register, or a message box at a data-read time. As one example, the error presence/absence signal (Status Info) 14 takes, without limitation, such a form that an error has been generated ("Error"), that a generated error has been corrected by the ECC ("Error corrected by ECC"), that an error which could not have been corrected by the ECC has been generated ("Error not corrected"), or that no error has been generated ("No Error").

As a determination table shown in FIG. 2, the transfer processing section 17 determines a hash request signal 22 based upon the hash necessity/non-necessity signal 18 and the error presence/absence signal 14 to feed the hash request signal 22 to the AACS processing section 21 and DMA-transfer read information from the data read section 12 to the AACS processing section 21.

That is, as one example of the hash request signal 22 determined by the transfer processing section 17 are as follows:

When the hash necessity/non-necessity signal 18 is on and the error presence/absence signal 14 is "No Error", the hash request signal 22 is on.

When the hash necessity/non-necessity signal 18 is on and the error presence/absence signal 14 is "Error", the hash request signal 22 is off.

When the hash necessity/non-necessity signal 18 is off and the error presence/absence signal 14 is "No Error", the hash request signal 22 is off.

When the hash necessity/non-necessity signal 18 is off and the error presence/absence signal 14 is "Error", the hash request signal 22 is off.

When the hash necessity/non-necessity signal 18 is on and the error presence/absence signal 14 is absent, the hash request signal 22 is off.

When the hash necessity/non-necessity signal 18 is off and the error presence/absence signal 14 is absent, the hash request signal 22 is off.

Thereby, since the optical disk apparatus 1 performs hash processing (corruption detection) in the AACS processing section 21 to prevent corruption of content performed by a third party and occurrence of erroneous recognition of corruption due to an error generated at a read time of an optical disk, a stable reproduction processing can be performed.

Thereafter, the hash request signal 22 determined by the transfer processing section 17 is supplied to the AACS processing section 21 to be subjected to a processing shown in FIG. 3 so that hash processing can be performed at a proper timing. The hash processing at the AACS processing section 21 is a processing which calculates a hash value of a certain unit (EVOBU) in a stream to compare the calculated result and an expected value with each other, thereby confirming whether or not the EVOBU has been corrupted.

That is, as shown in the flowchart shown in FIG. 3, when the AACS processing section 21 is supplied with a stream via the buffer 19 or the like (step S11), it first performs analysis of a pack (step S12). When the AACS processing section 21 determines that the input stream is a navigation pack (head of EVOBU) (step S13), it determines whether or not a hash flag which is the previous hash necessity/non-necessity signal 18 is on and a hash flag which is a current hash necessity/non-necessity signal 18 is on (step S14), and when the determination is affirmative, the AACS processing section 21 proceeds to step S15, but when the determination is negative, it proceeds to step S16.

When the hash flag which is the previous hash necessity/non-necessity signal 18 is on and the hash flag which is the current hash necessity/non-necessity signal 18 is on, if the EVOBU is the previous EVOBU hash-calculated, the AACS processing section 21 checks that the EVOBU has not been corrupted from such a fact that the hash value of the calculated EVOBU coincides with the expected value (step S15). When corruption is confirmed at this step, as one example, the reproduction processing is stopped but when corruption is not confirmed, the reproduction processing is continued.

Next, when the hash flag which is the current hash necessity/non-necessity signal 18 is on (step S16), the AACS processing section 21 checks a hash value of the stream (step S17). If the corruption is confirmed at this step, as one example, the reproduction processing is stopped but when corruption is not confirmed, the reproduction processing is continued.

Further, the AACS processing section 21 performs calculation of a content key (step S18), and it changes CCI and checks Binding information using TKP, URP, TKF, and TUF (step S19). Thereafter, the AACS processing section 21 terminates the processing when the current stream is at an end but the AACS processing section 21 returns to step S12 to repeat the processing when the current stream is not at an end.

Further, when the AACS processing section 21 determines that the current stream is not the NV pack at step S13 (step S13), it determines whether or not the hash flag which is the current hash necessity/non-necessity signal 18 is on. When the AACS processing section 21 determines that the hash flag which is the current hash necessity/non-necessity signal 18 is on, it checks a hash value of the stream (step S22). If the corruption is confirmed at this step, as one example, the reproduction processing is stopped but when corruption is not confirmed, the reproduction processing is continued.

Further, the AACS processing section 21 determines whether or not the pack has been encrypted (step S23), and it decodes the pack to supply the same to the reproduction section 23 at the downstream stage when the pack has been encrypted (step S24). These steps are repeated until the processing reaches the end of the stream (step S20).

According to the following procedure, the AACS processing section 21 performs the hash processing when the hash processing necessity/non-necessity signal 18 from the control section 16 requests hash processing by "Hash Check On" or the like during reproduction or the like and the error presence/absence signal 14 from the data read section 12 indicates the absence of an error. Otherwise, the AACS processing section 21 does not perform hash processing in such a case that when the hash processing necessity/non-necessity signal 18 does not request hash processing or when the error presence/absence signal 14 indicates the presence of an error. Thereby, deliberate corruption of the stream performed by a third party can be prevented without interrupting the reproduction processing due to erroneous determination in the hash processing.

Next, another embodiment of the abovementioned optical disk apparatus shown in FIG. 1 will be explained in detail with reference to the drawings.

Second Embodiment

Figure 4:
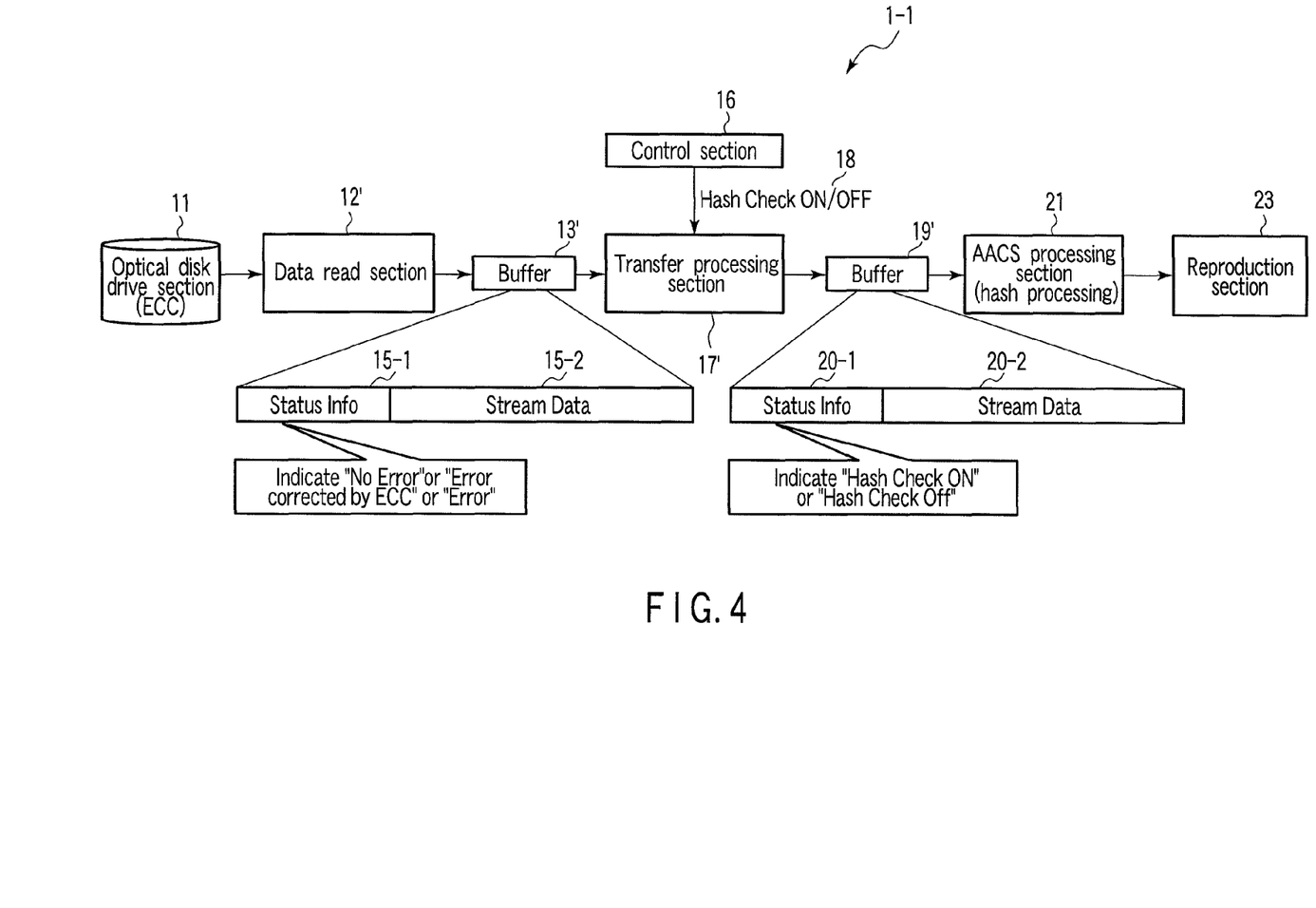
FIG. 4 is a block configuration diagram for explaining a second embodiment of an optical disk apparatus according to the present invention.

FIG. 4 is a block diagram showing one example of a configuration of a second embodiment of an optical disk apparatus according to the present invention.

As shown in FIG. 4, a feature of an optical disk apparatus 1-1 according to the second embodiment lies in that an error presence/absence signal 15-1 is added to a head of stream data 15-2 to be supplied to a dedicated buffer 13' under control of a data reading section 12'. Similarly, a feature of the optical disk apparatus 1-1 lies in that a hash request information 20-1 is added to a head of stream data 20-2 to be supplied to a dedicated buffer 19' under control of a transfer processing section 17'.

Thereby, since control information for each stream can be supplied to a downstream stage reliably, operation reliability can be improved.

Third Embodiment

Figure 5:
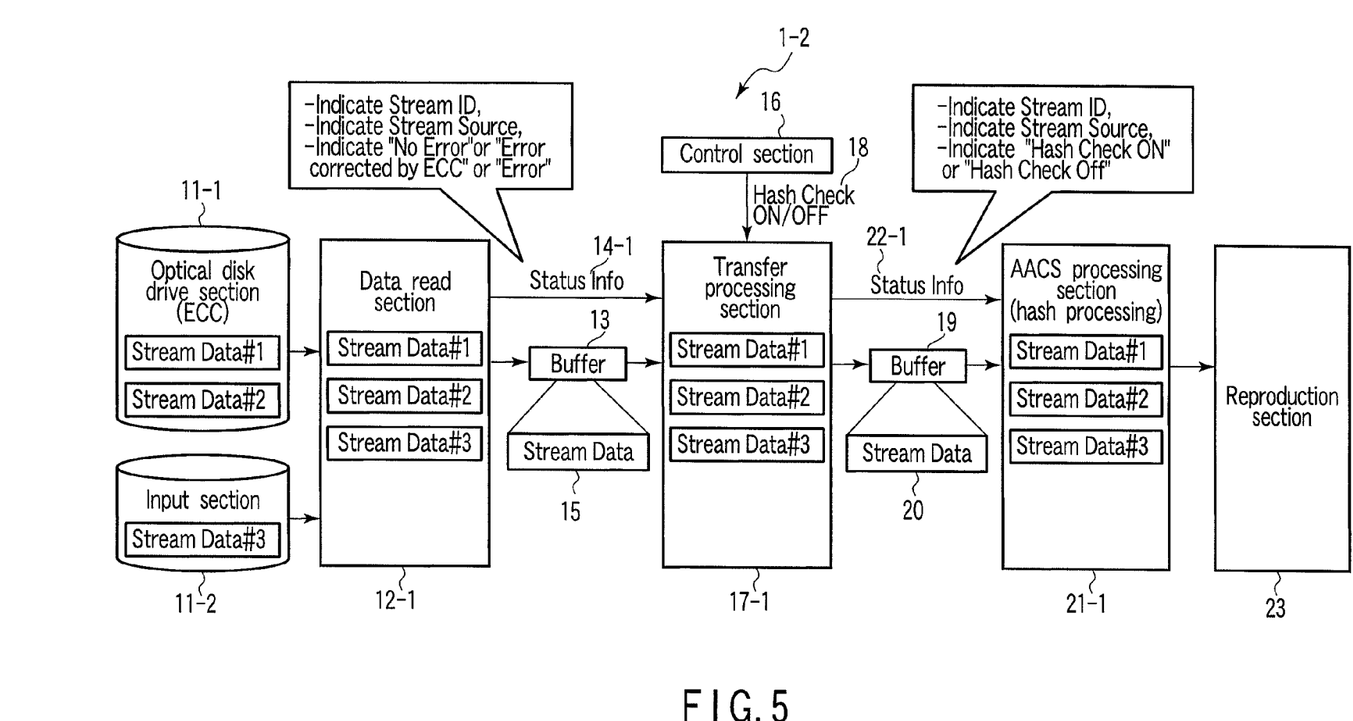
FIG. 5 is a block configuration diagram for explaining a third embodiment of an optical disk apparatus according to the present invention.

FIG. 5 is a block diagram showing one example of a configuration of a third embodiment of an optical disk apparatus according to the present invention.

As shown in FIG. 5, a feature of an optical disk apparatus 1-2 according to the third embodiment lies in that a plurality of streams are independently read from an optical disk drive section 11-1 under control of a data read section 12-1 and the respective streams are managed using their different stream IDs. Accordingly, an error presence/absence signal 14-1 and a hash request information 22-1 are managed by respective streams ID, and the data read section 12-1, a transfer processing section 17-1, and an AACS processing section 21-1 process the error presence/absence signals 14-1 and the hash request information 22-1 managed by the stream IDs for each stream.

Further, since an input section 11-2 is provided, for example, a stream which is supplied from a network and whose error detection is not performed by EEC or the like can be simultaneously processed. Incidentally, it is desirable that the transfer processing section 17-1 does not perform hash to a stream which does not accompany such an error presence/absence signal as shown in FIG. 2, as one example.

Thereby, since the optical disk apparatus 1-2 according to the third embodiment can simultaneously process a plurality of streams independently, corruption prevention which does not accompany malfunction can be performed while being performing such a processing as reproduction of a plurality of moving pictures on one screen.

Fourth Embodiment

Figure 6:
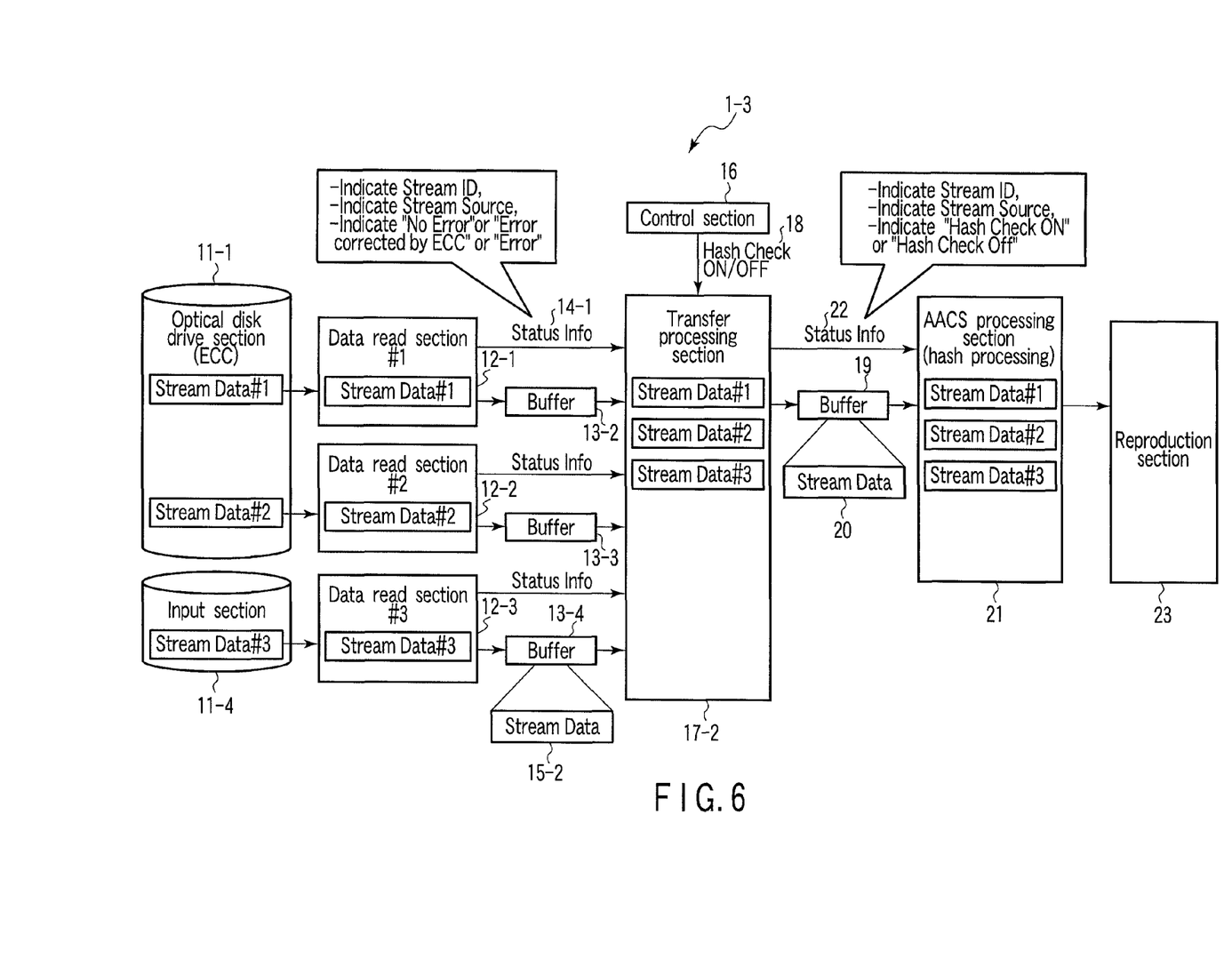
FIG. 6 is a block configuration diagram for explaining a fourth embodiment of an optical disk apparatus according to the present invention.

FIG. 6 is a block diagram showing one example of a configuration of a fourth embodiment of an optical disk apparatus according to the present invention.

As shown in FIG. 6, a feature of an optical disk apparatus 1-3 according to the fourth embodiment lies in that, by further making data read sections 12-1, 12-2, and 12-3 independent, a plurality of streams are reliably read from an optical disk drive section 11-1 under control of the data read section 12-1, 12-2, and 12-3 and the respective streams are managed their different stream IDs. According to adoption of such a configuration, buffers 13-2, 13-3, and 13-4 are provided independently.

With such a configuration, the optical disk apparatus 1-3 according to the fourth embodiment can process a plurality of streams stably, simultaneously, and independently, and the abovementioned corruption prevention which does not cause malfunction can be achieved while being performing such a processing as reproduction of a plurality of moving pictures on one screen.

Fifth Embodiment

Figure 7:
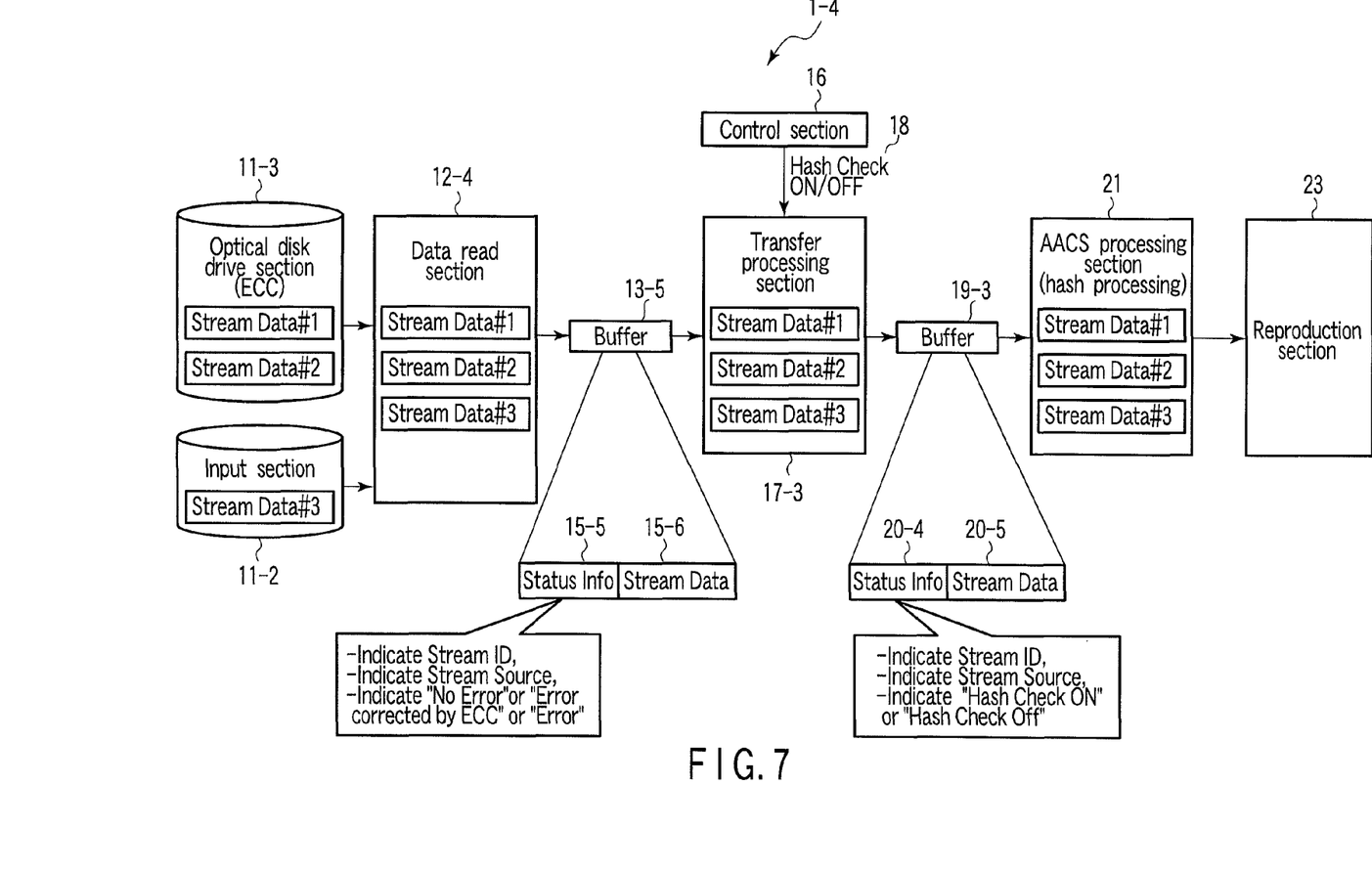
FIG. 7 is a block configuration diagram for explaining a fifth embodiment of an optical disk apparatus according to the present invention.

FIG. 7 is a block diagram showing one example of a configuration of a fifth embodiment of an optical disk apparatus according to the present invention.

As shown in FIG. 7, a feature of the optical disk apparatus 1-4 according to the fifth embodiment lies in that the processing "an error presence/absence signal 15-5 is added to a head of stream data 15-6 to be supplied to a dedicated buffer 13-5" in the second embodiment and the processing "a plurality of streams are independently read and the respective streams are managed using their different stream IDs" in the third embodiment are simultaneously performed.

With such a configuration, by supplying control information for each stream to a downstream stage reliably, operation reliability is improved and a plurality of streams can be simultaneously processed independently, and corruption prevention which does not cause malfunction is made possible while performing such a processing as reproduction of a plurality of moving pictures on one screen.

Sixth Embodiment

Figure 8:
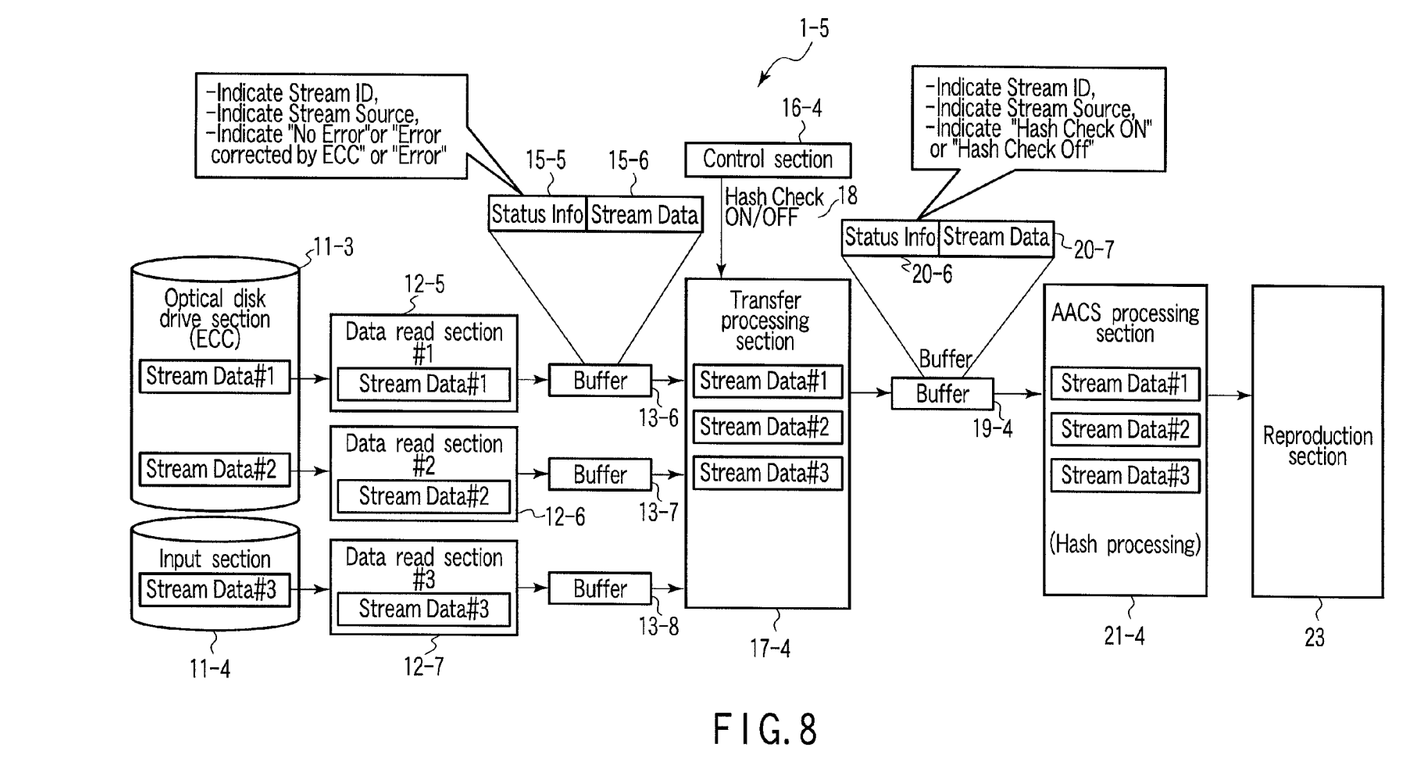
FIG. 8 is a block configuration diagram for explaining a sixth embodiment of an optical disk apparatus according to the present invention.

FIG. 8 is a block diagram showing one example of a configuration of a sixth embodiment of an optical disk apparatus according to the present invention.

As shown in FIG. 8, a feature of an optical disk apparatus 1-5 according to the sixth embodiment lies in that the processing "an error presence/absence signal 15-5 is added to a head of stream data 15-6 to be supplied to dedicated buffers 13-6, 13-7, and 13-8" in the second embodiment and the processing "data read sections 12-5, 12-6, and 12-7 are further made independent so that a plurality of streams are reliably read from an optical disk drive section and the respective streams are managed using their different stream IDs" in the fourth embodiment can be performed simultaneously.

With such a configuration, by supplying control information for each stream to a downstream stage reliably, operation reliability is improved and a plurality of streams can be simultaneously processed independently, and corruption prevention which does not cause malfunction is made possible while performing such a processing as reproduction of a plurality of moving pictures on one screen.

That is, according to the abovementioned optical disk apparatus according to the present invention, a plurality of AV streams AACS-protected can be decoded at the AACS processing section using simple hardware pieces of the number less than the number of streams.

Corruption verification of a plurality of AV streams AACS-protected can be performed at the AACS processing section using simple hardware pieces of the number less than the number of streams.

The number of the buffers can be reduced in a system for processing a plurality of AV streams in parallel within an apparatus.

It is possible to prevent erroneous detection of corruption of content generated by the error correction function of the ECC of drive.

The decoding and corruption verifying processing of stream data AACS-protected can be realized without interposition of a switch as far as possible.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disk apparatus comprising:
a read section configured to read data from an optical disk to output read information;
a determination section configured to determine presence or absence of an error of the read information to output an error presence or absence signal;
a transfer processing section configured to receive the error presence or absence signal from the determination section and to receive a hash request signal requesting hash processing, wherein the transfer processing section is configured to transfer a hash request signal when the error presence or absence signal indicates the absence of an error and not to transfer a hash request signal when the error presence or absence signal indicates the presence of an error; and
a processing section configured to perform hash processing to the read information upon reception of the hash request signal from the transfer processing section.

2. The optical disk apparatus of claim 1, further comprising a buffer configured to store the error presence or absence signal from the determination section.

3. The optical disk apparatus of claim 1, wherein the determination section is configured to add different stream IDs to a plurality of streams contained in the read information.

4. The optical disk apparatus of claim 1, further comprising an input section configured to receive a video signal without the error presence or absence signal, wherein the transfer processing section is configured not to supply the hash request signal to a downstream stage upon receiving the hash request signal when the video signal without the error presence or absence signal is supplied to the apparatus.

5. The optical disk apparatus of claim 1, further comprising a plurality of read control sections configured to control reading processes to receive a plurality of video streams of the read information from the read section, and to supply the plurality of video streams to the transfer processing section, respectively.

6. The optical disk apparatus of claim 1, further comprising a control section configured to supply no hash request as the hash request signal to the transfer processing section when the optical disk apparatus receives a command of fast-forward or reverse of the optical disk and supply an affirmative hash request as the hash request signal to the transfer processing section when the optical disk apparatus receives a command of reproduction of an optical disk.

7. The optical disk apparatus of claim 1, wherein the apparatus is configured to stop a reproduction process of the read information of the optical disk when the processing section performed hash processing and then determined that the read information had been corrupted.

8. An optical disk processing method comprising:
reading data from an optical disk to output read information;
determining presence or absence of an error of the read information to output an error presence or absence signal;
performing hash processing of the read information when a hash request signal requesting hash processing is received and the error presence or absence signal indicates the absence of an error; and
performing no hash processing of the read information when a hash request signal requesting hash processing is received and when the error presence or absence signal indicates the presence of an error.

9. The optical disk processing method of claim 8, further comprising
storing the error presence or absence signal in a buffer.

10. The optical disk processing method of claim 8, further comprising
adding different stream IDs to a plurality of different streams contained in the read information, respectively, while determining presence or absence of an error of the read information to output an error presence or absence signal.

* * * * *